United States Patent [19]

Plackis

[11] Patent Number: 5,713,629
[45] Date of Patent: Feb. 3, 1998

[54] CONVERTIBLE MOTORCYCLE SEATS

[76] Inventor: Thomas Plackis, 12 Central St., Greenlawn, N.Y. 11740

[21] Appl. No.: 774,135

[22] Filed: Dec. 26, 1996

[51] Int. Cl.⁶ ............................................. A47C 15/00
[52] U.S. Cl. ...................... 297/236; 297/243; 297/195.1
[58] Field of Search ........................... 297/232, 236, 297/237, 239, 243, 257, 195.1, 195.12, 201, 215.14, 311

[56] References Cited

U.S. PATENT DOCUMENTS

| | | | |
|---|---|---|---|
| 2,320,210 | 5/1943 | Bender | 297/243 X |
| 3,549,172 | 12/1970 | McBroom et al. | 280/202 |
| 4,563,038 | 1/1986 | Hirose | 297/243 |
| 5,533,783 | 7/1996 | Harms et al. | 297/195 |

FOREIGN PATENT DOCUMENTS

| | | | |
|---|---|---|---|
| 2641586 | 3/1978 | Germany | 297/195.1 |
| 504541 | 12/1954 | Italy | 297/243 |
| 63986 | 3/1990 | Japan | 297/243 |

*Primary Examiner*—Laurie K. Cranmer
*Attorney, Agent, or Firm*—Kenneth P. Robinson

[57] ABSTRACT

A convertible seat for a motorcycle in which a solo seat optionally conceals a passenger seat within a cavity. The passenger seat may be wholly enclosed within the solo seat or withdrawn and secured to the motorcycle fender for use. A pair of tracks may be included for maintaining the passenger seat in position when extended. A fastener permits securing the passenger seat to a fender of the motorcycle, and the passenger seat is configured to preclude accidental total withdrawal from the solo seat. The solo seat may include a flexible flap for enclosing and concealing the passenger seat within the operator seat when the passenger seat is not in use. Alternatively, the rear end of the passenger seat may be shaped to conform to the rear opening in the operator seat to mask the presence of the passenger seat when not in use.

14 Claims, 2 Drawing Sheets

CONVERTIBLE MOTORCYCLE SEATS

The invention relates generally to seats for motorcycles, and more particularly to a seat which is convertible from an operator's solo seat to a combination solo seat and passenger seat, while providing optional concealment of the passenger seat when not in use.

BACKGROUND OF THE INVENTION

A great variety of motorcycle seats are available, predominantly providing either a solo seat or a solo seat and permanently mounted passenger seat. Where the operator may only occasionally transport a passenger it may be convenient to have a passenger seat available where no permanent such seat has been mounted.

Prior tandem seat arrangements have been of a permanent nature, albeit having some degree of adjustment for the comfort of the operator. U.S. Pat. No. 4,563,038, Motorcycle Seat Assembly, describes a seat assembly including an operator seat and a passenger seat in which the operator seat is adjustable in height and the passenger seat has a limited degree of fore and aft adjustability.

U.S. Pat. No. 3,549,172, Seating and Backrest Combination for a Multicycle Vehicle disclosed a sectional arrangement in which one section forms a permanent driver's seat, and a pair of hinged sections are moveable to provide either a backrest for the operator or a seat for a second occupant.

However, such prior arrangements have required permanently exposed passenger seat configurations, and have been neither attractive nor cost-efficient for the operator who only occasionally desires to transport a passenger.

Objects of the present invention are, therefore, to provide new and improved convertible motorcycle seats for operator and passenger, and such seats providing one or more of the following features:

a. wholly concealable within the operator's seat;

b. extendible at the operator's option;

c. protection against accidental disassembly;

d. secured by a quick-release fastener to the motorcycle.

These features are not taught by the prior art.

SUMMARY OF THE INVENTION

In accordance with the invention, a seat for a motorcycle is convertible from a solo seat to a solo plus passenger seat, wherein the passenger seat is optionally wholly housed within a cavity in the solo seat when not in use. The convertible seat for a motorcycle includes operator and passenger seats, the operator seat being mounted to the motorcycle and having a longitudinal cavity with a rear opening. The passenger seat is adapted to be inserted within the cavity, via the rear opening, for storage and to be extended rearwardly from the cavity so as to provide for occupancy by a passenger.

The passenger seat may be secured within the operator seat when not required by a passenger. For this purpose, a flexible flap and fastener may be affixed rearwardly of the operator seat so as to enclose the cavity and the passenger seat. The convertible seat may also be provided with track means to permit sliding the passenger seat longitudinally, with respect to the operator seat, along the rear fender of the motorcycle. Preferably, in such embodiments a first track member is affixed longitudinally to the fender and slidably engages a second track member affixed to the passenger seat. In a preferred embodiment means are provided for securing the passenger seat to the fender when in an extended position. This may comprise a machine screw affixed rearwardly of the passenger seat and a corresponding machine nut secured to the fender for engaging the machine screw. In a further preferred embodiment the securing means may comprise a vertically disposed quick release pin for engaging a socket affixed to the fender so as to secure the passenger seat to the fender in the extended position.

The invention may further include a pair of retaining pins laterally disposed at a rearward edge of the operator seat within the cavity, the passenger seat being provided with a T-shaped forward end for engaging corresponding slots along the sidewalls of the operator seat cavity, wherein the T-shaped end and retaining pins are arranged and constructed to come into contact when the passenger seat is substantially fully extended, thereby acting to restrain complete withdrawal of the passenger seat from the cavity.

For a better understanding of the invention, together with other and further objects, reference is made to the accompanying drawings and the scope of the invention will be pointed out in the accompanying claims.

DESCRIPTION OF THE INVENTION

Figure 1:
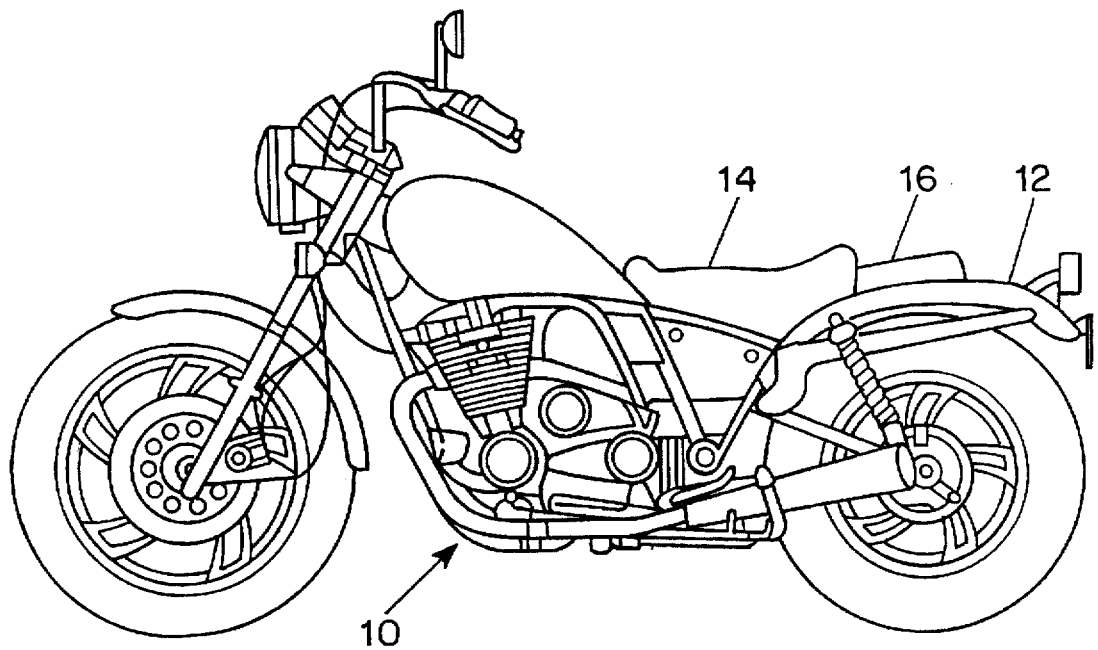
FIG. 1 is a side view of a motorcycle and convertible seat utilizing the invention.
Figure 2:
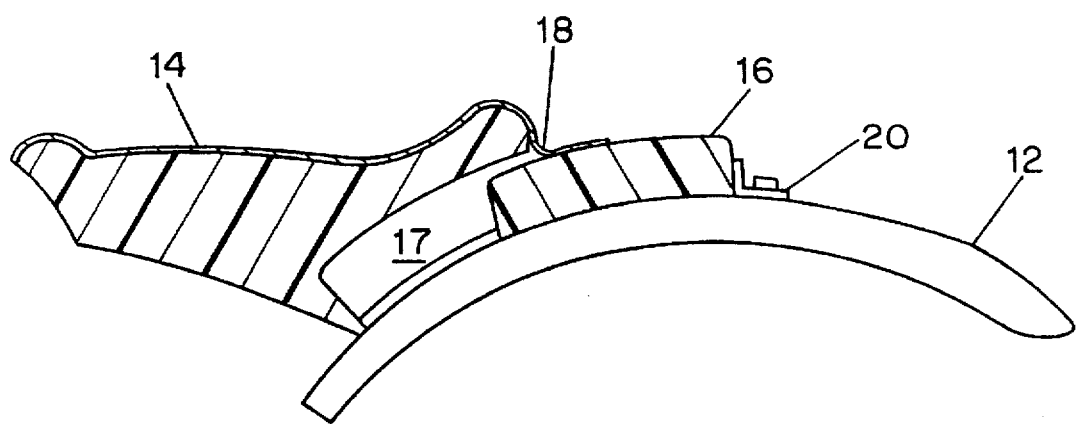
FIG. 2 is a part sectional side view of the invention of FIG. 1 taken through line 2—2 of FIG. 3.

Referring now to the drawings, in which a single reference number refers to the same or similar elements, FIG. 1 is a side view of a typical motorcycle installation utilizing a motorcycle seat which is convertible from a solo seat to a solo plus passenger seat, wherein the passenger seat is optionally wholly housed within a cavity in the solo seat when the operator is not carrying a passenger, as shown in expanded detail in FIG. 2. Motorcycle 10 is provided with a rear fender 12 mounted over the rear tire. The motorcycle frame supports a seat 14 for the operator, known in the art as an operator or solo seat, which in the prior art generally included no provision for seating a passenger. As shown in FIG. 1, in the operative extended position of the present invention, a passenger seat 16 extends rearwardly from operator seat 14 along fender 12.

Figure 3:
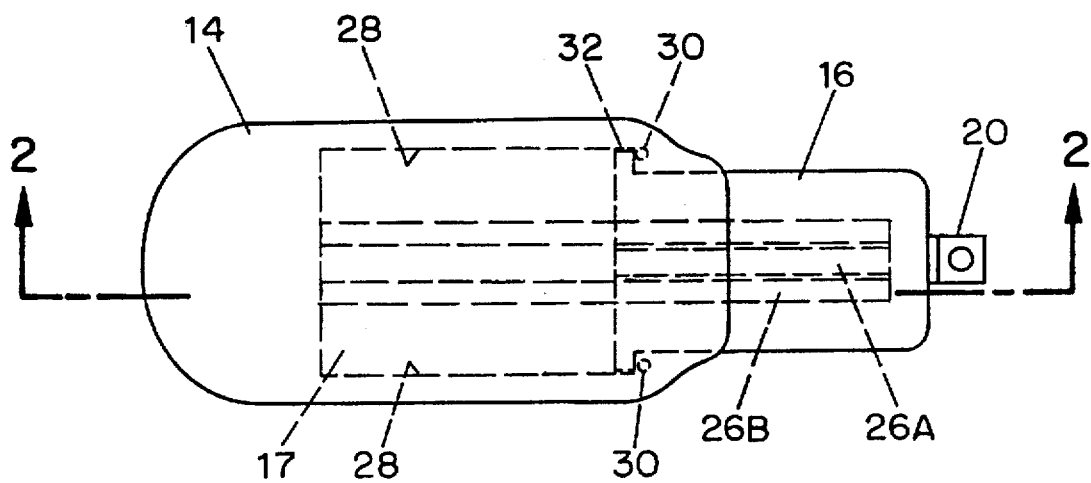
FIG. 3 is a plan view of the passenger seat extended from the operator seat, with a partial sectional view of cavity, slots, track members, retaining pins, and securing fastener.

Referring now to the part sectional view of FIG. 2, taken along line 2—2 of the plan view of FIG. 3, the operator seat 14 of the convertible seat assembly is of a generally elongated shape fixedly mounted to the motorcycle and provided with a cavity 17 extending longitudinally along the underside with a rear opening. Passenger seat 16 may, for example, be formed of a molded foam elastomer, a gel type cushion, or padding over springs, with a leather, vinyl or other suitable covering provided in a conventional manner. As shown, passenger seat 16 is in longitudinally aligned relationship with respect to operator seat 14 and of a suitable size in height, width and length to be wholly concealed within the cavity 17 of operator seat 14 for storage. When desired, passenger seat 16 may be extended rearwardly for occupancy by a passenger. A flexible flap 18, which may be formed of leather, vinyl, or other suitable material affixed rearwardly of operator seat 14 may be provided for covering the rear of passenger seat 16 when positioned within operator seat 14 and enclosing storage cavity 17 thereby. Alternatively, the rear end of passenger seat 16 may be configured for a close fit with the rear opening of cavity 17 and have a rear shape designed to conform to rear contours of operator seat 14, so as to at least partially hide or mask the presence of the passenger seat 16 when inserted within cavity 17.

Figure 4:
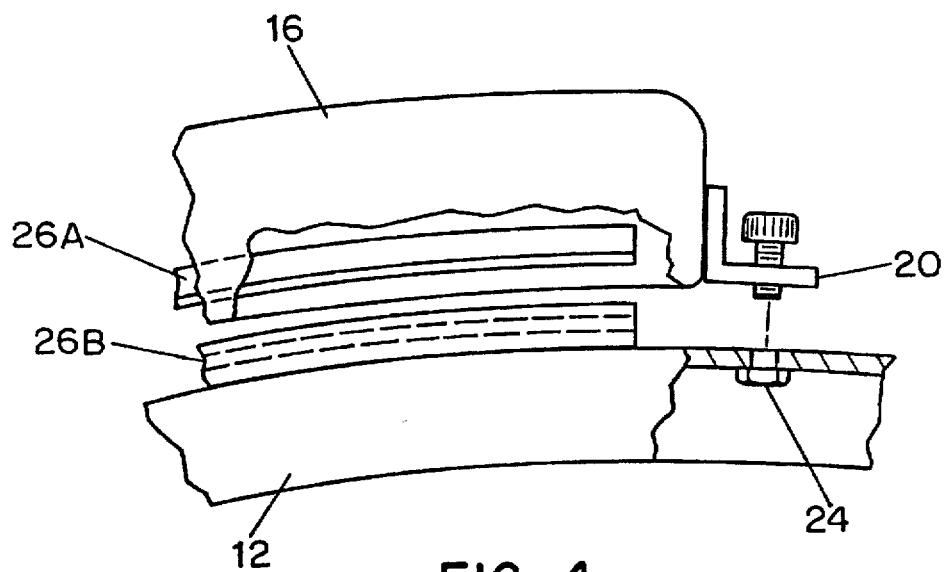
FIG. 4 is an exploded detail view of a first embodiment of the securing fastener and axial track members.

As illustrated, a machine screw and mounting bracket 20 provides means for securing passenger seat 16 to fender 12 when in an extended position. Machine screw and bracket 20 are affixed rearwardly of passenger seat 16 and mate with a corresponding machine nut 24 secured to the underside of fender 12, as shown in FIG. 4. An additional machine nut, like nut 24, may be secured to the underside of fender 12 at a position further forward so as to be in alignment with machine screw and mounting bracket 20 when passenger seat 16 is moved forward to its inserted position within cavity 17. Preferably, the machine screw, as shown at 20, will be formed of a knurled-head thumb screw for ease of operation without tools. Other fasteners are suitable. For example, in another embodiment the means for securing passenger seat 16 may comprise a vertically disposed quick release pin for engaging a socket affixed to fender 12 and thereby securing passenger seat 15 to fender 12 when in the extended position, while being readily disengaged to allow withdrawing passenger seat 16 into cavity 17.

Further details of the structure are shown in the plan view of FIG. 3. A pair of engageable track members 26A, 26B are disposed along fender 12 (not shown here) for allowing passenger seat 16 to be longitudinally and slidably positioned with respect to operator seat 14. In this arrangement, the first track member 26A is affixed longitudinally to fender 12 and slidable engaged with second track member 26B affixed to passenger seat 16. Track members 26A and 26B are preferably formed of a suitable plastic such that they readily conform to the contour of fender 12 while providing structural rigidity. In other arrangements, track arrangements may be omitted, with the lower surface of passenger seat 16 shaped to closely conform to the upper surface of fender 16 and arranged to be retained in place without the need for tracks. In such case, the upper surface of fender 12 will provide relatively minor visual evidence of the availability of an extendable passenger seat.

Also shown in FIG. 3 are cavity 17, lateral slots 28, retaining pins 30 and securing fastener 20. Cavity 17 is provided with a pair of opposing laterally disposed slots 28 for engaging stop means in the form of a T-shaped forward end 32 of passenger seat 16. A pair of laterally disposed retaining pins 30 are secured at a rearward edge of cavity 17 within operator seat 14 (forward and rearward refer to the front and rear of the motorcycle). The T-shaped end 32 engages slots 28 when passenger seat 16 is extended, until coming into contact with a rear portion of operator seat 14 (e.g., retaining pins 30). The T-shaped end 32 and retaining pins 30 are constructed and arranged to come into contact when passenger seat 16 is substantially fully extended, thereby to preclude or restrain complete withdrawal of seat member 16 from cavity 17, which could otherwise result in disengaging from track members 26A and 26B and complete release of seat 16.

FIG. 4 is an exploded side view of the track members and securing means for the passenger seat 16. As shown therein, upper track member 26A is secured to the bottom of passenger seat 16, for engagement with lower track member 26B. Machine screw and bracket assembly 20 is secured to the back end of passenger seat 16. A machine nut 24 for engaging screw 20 is secured by welding or other suitable means to the underside of fender 12, with a small hole for screw access to nut 24. As already noted, in other embodiments of the invention track members 26A and 26B may be omitted.

Figure 5:
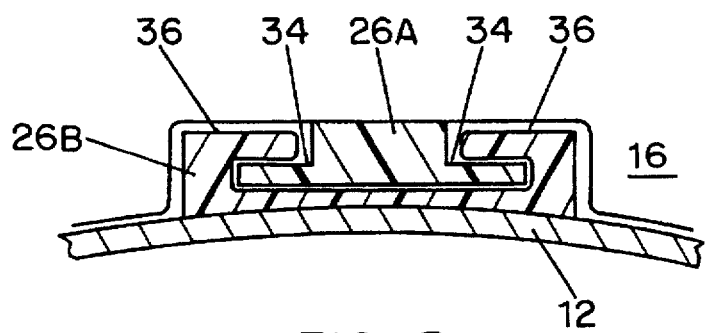
FIG. 5 is a sectional view of the track configuration

A cross-sectional view of one configuration of track members 26A and 26B is shown in FIG. 5. Track member 26A is preferably formed of a T-shaped cross section with outwardly extending flanges 34 and slides within track member 26B. Track member 26B is generally C-shaped in cross section with opposing retaining flanges 36 which cooperate with outwardly extending flanges 34 to hold passenger seat 16 secured to fender 12.

While the invention has been described in its preferred embodiments, it is to be understood that the words which have been used are words of description rather than limitation, and that changes may be made within the purview of the appended claims without departing from the true scope of the invention in its broadest aspects.

What is claimed is:

1. A convertible seat for a motorcycle, convertible from a solo seat to a solo plus passenger seat, wherein said passenger seat is slideably movable between an inserted position within a cavity in said solo seat, for concealment of the passenger seat in the absence of a passenger, and an extended exposed position on top of a rear fender, for use by a passenger;

said cavity being of adequate size to conceal the presence of the passenger seat when in said inserted position.

2. A convertible seat for a motorcycle as set forth in claim 1, wherein a lower surface of said passenger seat is shaped to conform to the upper surface of said rear fender.

3. A convertible seat for a motorcycle as set forth in claim 2, additionally including a fastener to retain the passenger seat in said extended position.

4. A convertible seat for a motorcycle as set forth in claim 1, additionally including a cover configured to enclose a rear opening to said cavity when the passenger seat is in said inserted position.

5. A convertible seat for a motorcycle as set forth in claim 1, additionally including stop means at the forward end of said passenger seat for engaging a rear portion of said operator seat to restrain complete removal of said passenger seat from said cavity.

6. A convertible seat for a motorcycle, comprising:

an operator seat suitable to be mounted on said motorcycle and having a cavity extending longitudinally with a rear opening; and a passenger seat adapted to be inserted within said cavity, via said rear opening, for storage and to be extended rearwardly from said cavity for occupancy by a passenger;

said cavity having internal dimensions adequate to substantially fully contain the passenger seat when inserted within the cavity.

7. A convertible seat for a motorcycle as set forth in claim 6, further comprising means for securing said passenger seat within said operator seat.

8. A convertible seat for a motorcycle as set forth in claim 7, said means for securing comprising a flap and fastener affixed rearwardly of said operator seat and suitable for enclosing said rear opening.

9. A convertible seat for a motorcycle as set forth in claim 6, wherein a lower surface of said passenger seat is shaped to conform to the upper surface of a rear fender of said motorcycle and a fastener is provided to retain the passenger seat in position when extended rearwardly.

10. A convertible seat for a motorcycle as set forth in claim 6, further comprising track means for longitudinally and slidably positioning said passenger seat with respect to said operator seat along a fender of said motorcycle.

11. A convertible seat for a motorcycle as set forth in claim 10, said track means comprising a first track member affixed longitudinally to said fender and slidably engaged with a second track member affixed to said passenger seat.

12. A convertible seat for a motorcycle as set forth in claim 6, additionally comprising stop means at the forward end of said passenger seat for engaging a rear portion of said operator seat to restrain complete removal of said passenger seat from said cavity.

13. A convertible seat for a motorcycle, comprising:

an operator seat suitable to be mounted on said motorcycle and having a cavity extending longitudinally with a rear opening; and a passenger seat adapted to be inserted within said cavity, via said rear opening, for storage and to be extended rearwardly from said cavity for occupancy by a passenger;

the rear end of said passenger seat being configured to fit said rear opening and conform to rear contours of said operator seat, so as to mask the presence of the passenger seat when inserted within said cavity.

14. A convertible seat for a motorcycle, comprising:

an operator seat suitable to be mounted on said motorcycle and having a cavity extending longitudinally with a rear opening;

a passenger seat adapted to be inserted within said cavity, via said rear opening, for storage and to be extended rearwardly from said cavity for occupancy by a passenger; and a fastener to secure said passenger seat to a fender of said motorcycle when the passenger seat is in an extended position, said fastener comprising a machine screw affixed rearwardly of said passenger seat and suitable to engage a corresponding machine nut secured to said fender.

\* \* \* \* \*